Dec. 30, 1958     E. D. HOESCH     2,866,615
BACKSEATED INLET VALVE
Filed April 19, 1956            2 Sheets-Sheet 1
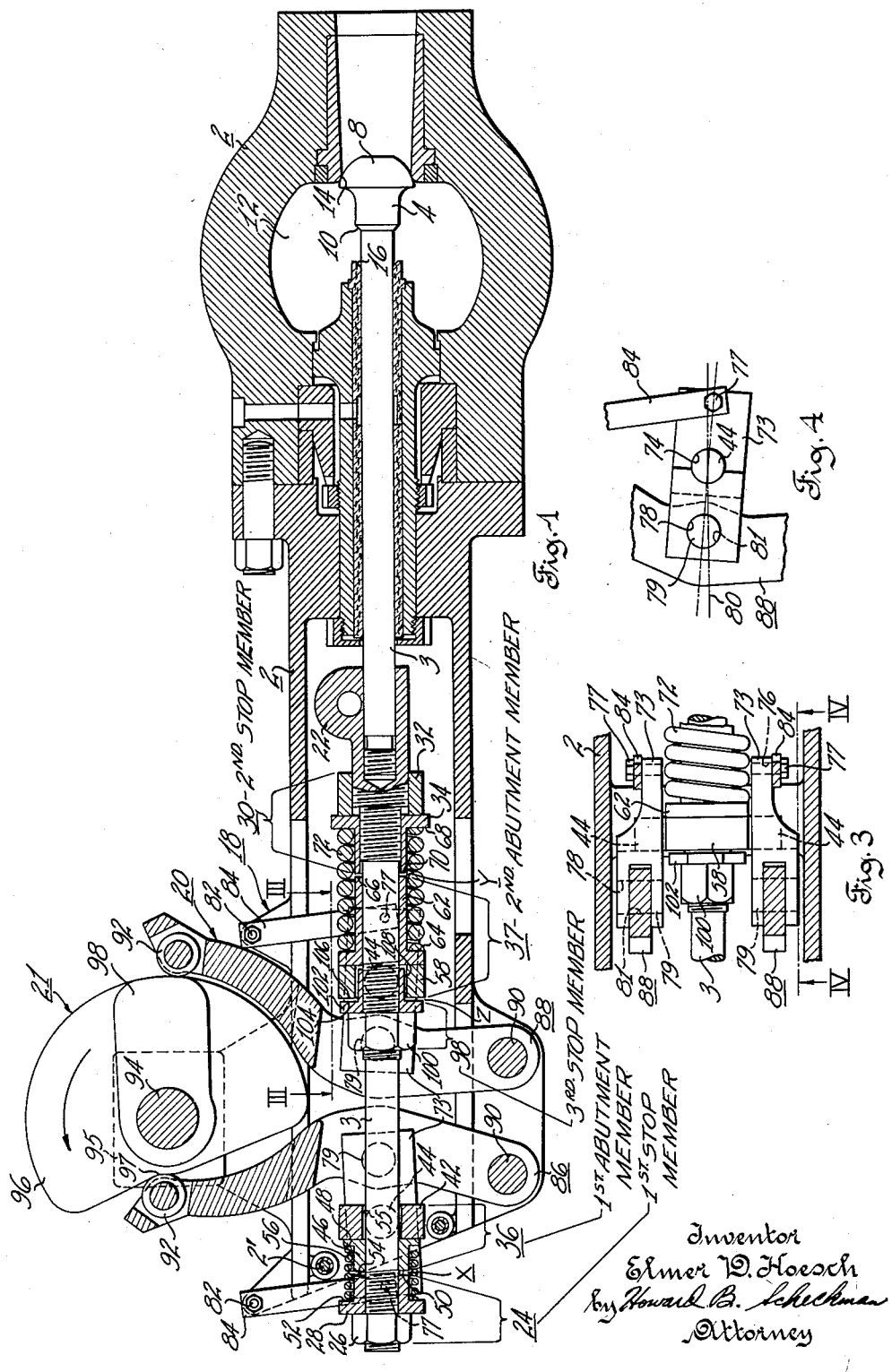
Inventor
Elmer D. Hoesch
By Howard B. Scheckman
Attorney

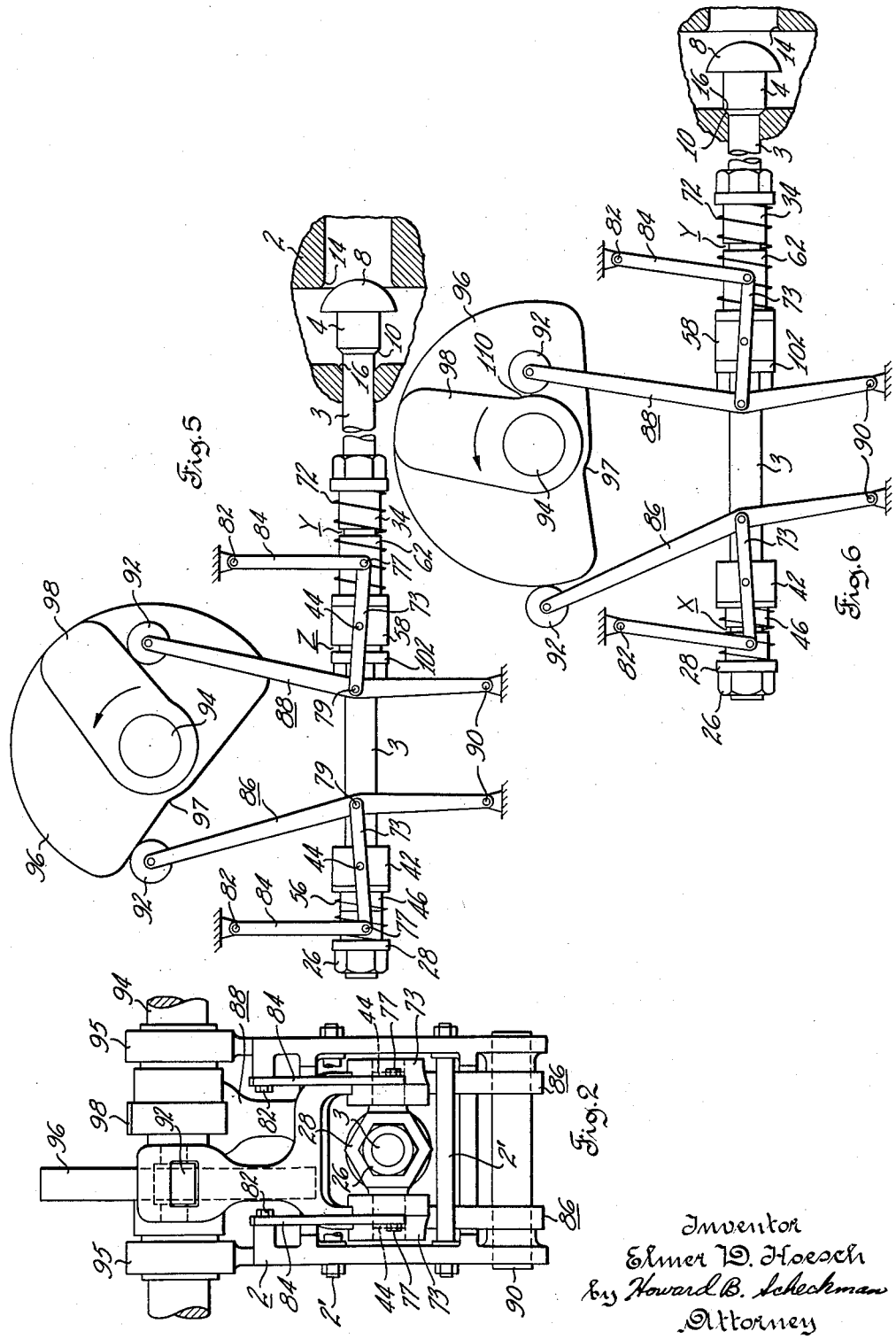

United States Patent Office 2,866,615
Patented Dec. 30, 1958

2,866,615

BACKSEATED INLET VALVE

Elmer D. Hoesch, West Allis, Wis., assignor to Allis-Chalmers Manufacturing Company, Milwaukee, Wis.

Application April 19, 1956, Serial No. 579,208

13 Claims. (Cl. 251—229)

This invention relates to steam turbines and more particularly to a valve for controlling the amount of elastic fluid flowing to a steam turbine.

The usual arrangement for regulating the amount of elastic fluid flowing to a steam turbine is to provide a plurality of valves in the steam supply chest and open the valves one at a time, using the valve that is in the process of being opened, for fine regulation of the amount of elastic fluid flowing to the turbine. The valves are usually controlled by a set of cams carried by a cam shaft. See U. S. Patent 2,666,452 to R. Sheppard et al. for example. A cam for each valve is placed at a different angle around the cam shaft. As the cam shaft rotates, it will open a first valve, before said first valve reaches its fully opened state, a second valve will begin to open. The first valve when fully opened will reach a dwell on its cam, and remain open while the cam shaft rotates to open the second valve, and so on. This is repeated for each valve, with the valve which is in the process of being opened, used for the fine regulation of the elastic fluid which flows to the turbine.

In present day high pressure, high temperature turbines, leakoff, that is, the portion of the elastic fluid which escapes between the packing and the valve shaft, has become appreciable and unless decreased, lowers the efficiency of the turbine. It is usual to decrease the amount of leakoff of the valve when it is opened, by backseating the valve. That is, the valve shaft is moved to a position wherein the valve shaft head serves to close the passage between the packing and the valve shaft. However, because of tolerances employed when manufacturing various parts of the mechanism which move the valve shaft, and the different thermal expansion rates of the parts, it is difficult to commercially produce a drive mechanism for the valve shaft which is cam operated and which will firmly and accurately backseat the valve shaft head, and also provide positive control of the valve shaft during the period the valve is used for regulation of the elastic fluid. In addition, this type of valve has a huge spring that acts in concert with the fluid pressure against the valve shaft head when the valve is being opened, so that the cam must act against the spring as well as the elastic fluid pressure when opening the valve. Once opened, the spring then acts in opposition to the fluid pressure and the spring has to be big enough to hold the valve against the elastic fluid. Further, when the valve is backseated, this huge spring remains compressed and the cam shaft must be provided with bearings to withstand this load.

An object of this invention is to provide a drive mechanism for a valve which will provide positive control of the valve shaft during the period of regulation, particularly the period when the elastic fluid pressure on the valve shaft head changes direction due to the differences in area between the two surfaces of the valve shaft head.

Another object of this invention is to provide a drive mechanism which will permit the valve shaft to move relative to the drive mechanism when the valve shaft head seats, to compensate for tolerances in the parts of the drive mechanism as well as thermal expansion of the parts.

Another object of this invention is to provide an arrangement for moving the valve shaft in a true rectilinear path.

Another object of this invention is to provide an arrangement which will reduce the forces on the cam shaft bearings when the valve shaft has been backseated.

Another object of this invention is to provide an arrangement wherein the only force necessary to move the valve shaft is the force to overcome the fluid pressure on the valve shaft head.

Other advantages and objects will appear from the following description considered in conjunction with the attached drawings, in which:

Fig. 1 is a view of the valve shaft with the valve shaft head seated against the balance seat to close the valve;

Fig. 2 is an end view taken from the left side of the valve, as shown in Fig. 1 illustrating the cam followers, the trunnion carriers, the links members, and their interconnection with the valve shaft;

Fig. 3 is a sectional view of Fig. 1, taken in the direction of arrows III—III showing the trunnion carriers, the abutment member, and the trunnions on the abutment member received in the trunnion carriers;

Fig. 4 is a sectional view taken in the direction of arrows IV—IV of Fig. 3 illustrating the connection between the trunnion carrier, the cam follower and the links;

Fig. 5 is a view siimlar to Fig. 1 illustrating the valve shaft head in an intermediate position between the front seat and the back seat; and Fig. 6 is a view similar to Fig. 1 illustrating the valve shaft head backseated.

Referring to Fig. 1, the valve is made up of a housing 2 having supporting cross braces 2'. Valve housing 2 receives a rectilinearly reciprocable valve shaft 3 which is provided with a head 4 which has a front face 8 and a back face 10. Valve shaft head 4 reciprocates in a steam supply chest 12 provided in valve housing 2. The valve housing is provided with a front seat 14 and a back seat 16. Front face 8 of valve shaft head 4 abuts front seat 14 to close the valve, and back face 10 abuts back seat 16 to fully open the valve and backseat the valve shaft head. Carriage means, indicated generally by arrow 18, support the valve shaft for rectilinear reciprocating movement. Drive means, indicated generally by arrow 20, move the valve shaft between front seat 14 and back seat 16, and control means, indicated generally by arrow 21, control the drive means.

Valve shaft 3 is made in two parts. Referring to Fig. 1 the right hand part of valve shaft 3 is adjustably threaded into a clamp 22 on the end of the left hand part of valve shaft 3.

Valve shaft 3 carries two fixed, spaced stop members on which the forces act which move the valve shaft. Referring to Fig. 1 a first stop, indicated by bracket 24, is threadedly attached to valve shaft 3. Said first stop comprises a lock nut 26 and a guide nut 28. Threaded to the right end of the valve shaft (as viewed in Fig. 1) is a second stop member, indicated by bracket 30, which comprises a lock nut 32 and a guide nut 34. Lock nuts 26 and 32 retain guide nuts 28 and 34, respectively, in place, to prevent guide nuts 28, 34 from moving relative to valve shaft 3 when they receive the forces which move the valve shaft.

Valve shaft 3 carries first and second, spring urged, movable abutment members between first stop 24 and second stop 30, to transmit the force from the drive means, which move the valve shaft, to the two stop members. Carried adjacent first stop 24 is a first abutment 36 which slidably receives valve shaft 3. Carried adjacent second stop member 30 is a second abutment member 37 which also slidably receives valve shaft 3.

First abutment member 36 is made in two relatively slidable parts to permit one part to slide perpendicular to valve shaft 3 to permit the abutment to move relative to the valve shaft, so the valve shaft is self-centering. The first abutment comprises an abutment sleeve 42 having oppositely projecting trunnions 44, and a spring abutment sleeve 46. Spring abutment sleeve 46 has a shoulder 48 and a shoulder 50 both facing first stop member 24. Stop member 24 has complementary shoulders 52 and 54 facing shoulders 48 and 50, respectively, on spring abutment sleeve 46. A space 55 is provided between the surface of the valve shaft and abutment sleeve 42 to permit the abutment sleeve to slide perpendicular to the valve shaft so the valve shaft can center itself. A coil spring 56 is carried between shoulder 52 of first stop member 24 and shoulder 48 of first abutment member 36. Coil spring 56 tends to move first abutment member 36 away from first stop member 24 to form a gap X between the two members.

Second abutment member 37 is also made in two relatively slidable parts 58, 62 to permit one part to slide perpendicular to valve shaft 3, to permit the valve shaft to be self-centering with respect to the abutment. Referring to Fig. 1, the second abutment comprises an abutment sleeve 58 having opposed projecting trunnions 44 (Fig. 3) which extend from said sleeve, and a spring abutment sleeve 62. Spring abutment sleeve 62 has a shoulder 64 and a shoulder 66 which face complementary shoulders 68 and 70, respectively, on second stop member 30. A coil spring 72 is carried between shoulder 64 of the spring abutment sleeve member and shoulder 68 of the second stop member. Coil spring 72 urges second abutment member 37 away from second stop member 30 to form a gap Y between the two members.

Limit means are provided to cooperate with said drive means to take up the force of said coil spring 72. Said limit means comprises a third stop member indicated by bracket 98 which limits the movement of second abutment member 37 to the left (Fig. 1) as urged by spring 72. The third stop (Fig. 1) is affixed to valve shaft 3 between first stop member 30 and second stop member 24. Third stop member 98 is made in two parts and comprises a lock nut 100 threadedly attached to valve shaft 3 and a guide nut 102 also threadedly attached to valve shaft 3. Lock nut 100 maintains guide nut 102 in place. Guide nut 102 is provided with a shoulder 104 which faces and is engaged by a complementary shoulder 106 on abutment sleeve member 58, when the abutment sleeve member 58 closes a gap Z between the two members, and moves into engagement with the third stop member. A space 108 is provided between the outer surface of guide nut 102 and the inner surface of abutment sleeve 58. Space 108 provides room for movement of abutment sleeve 58 relative to valve shaft 3 so the valve shaft will be self-centering, as stated above.

The valve shaft is supported for rectilinear movement by a carriage. The carriage comprises four trunnion carriers 73 (Figs. 1–4) which receive and support trunnions 44 of the abutment sleeve members. Each trunnion carrier is pivotally supported at both ends. Four links 84 are provided to support one of the ends of the trunnion carriers, and drive means are provided to pivotally support the other ends of the trunnion carriers.

Each of the trunnion carriers 73 (see Figs. 1 through 4) is provided with three openings. A center opening 74 which receives the trunnion 44, an opening 76 (see Fig. 3) in one end so that end can be rotatably connected to a link 84, and an opening 78 in the other end so that end can be rotatably connected to the drive means. The end of the trunnion carrier which has opening 78 is yoke shaped to receive the drive means (see Fig. 3).

The four links 84 are rotatably supported at one end from housing 2 by pivots 82. The other end of each link 84 carries a pivot member 77 to be received in opening 76 in the trunnion carrier.

The drive means which pivotally supports the other end of the trunnion carriers, also drives the trunnion carriers, and in turn, the abutments against the stops to cause the valve shaft head to reciprocate between the front seat and the back seat. Said drive means comprises first and second cam followers 86, 88 which are each rotatably supported at one end from the housing by pivots 90. The cam followers and links are pivoted from the housing on opposite sides of the valve shaft. First cam follower 86 drives the trunnion carriers which support the trunnions 44 of the first abutment sleeve member, and second cam follower 88 drives the trunnion carriers which support the trunnions 44 of the second abutment sleeve member. Each cam follower is bifurcated to support the pair of trunnion carriers which support the same abutment sleeve member. Carried on the opposite end of each cam follower is a roller 92, for engagement with a control means. The portion intermediate the two ends, of each of the bifurcations of each cam follower, is provided with an opening 81 (Fig. 3). The portion of each cam follower which has the opening 81 is received in the yoke shaped portion of each trunnion carrier, and a pivot 79 is passed through openings 78 and 81 to rotatably lock the members together.

Control means are provided to control the movement of the cam followers. Said control means comprises a cam shaft 94 rotatably mounted in bearings 95 carried in housing 2. Cam shaft 94 carries a first cam 96 which drives first cam follower 86, and a second cam 98 which drives second cam follower 88.

The trunnion members, as they are moved by the cam followers, will constrain the valve shaft to rectilinear movement, and prevent the valve shaft from unevenly wearing the packing which would increase leakoff and necessitate replacement. Referring to Fig. 1, the distance between pivots 82 and 77 of link members 84 is equal to the distance between pivots 90 and 79 of cam followers 86, 88; and the distance from trunnion 44 to pivot 77 is equal to the distance from the trunnion 44 to pivot 79. Further, referring to Fig. 4, pivot 77 is mounted below center line 80 while pivot 79 is mounted above center line 80. As the trunnion members 73 are moved by their respective cam followers, one end of the trunnion member will move in an arc about pivot 90 and the other end of the trunnion carrier will move in arc about pivot 82. The movement of the trunnion member is such that, as one end of the trunnion member raises, the other end of the trunnion member will correspondingly lower. The trunnion member, as it moves, will pivot about a point which does not move up or down relative to the valve shaft, and it is at this point in the trunnion members that openings 74 are provided to receive trunnion members 44.

It should be noted that as the valve is opened, there is pressure from the elastic fluid on both sides of the valve shaft head 4. Initially this pressure is against the back surface of the valve shaft head. As a result it takes actual force to lift the valve shaft head off its balance seat 14 because the fluid pressure has to be overcome. However, when the valve is moved about halfway open (see Fig. 5), there is a compensating effect of the fluid pressure on the valve shaft head 4. The fluid pressure now acts on both faces of the valve shaft head. Inasmuch as the back side of the valve shaft head has a lesser area because of the valve shaft 3, there occurs a point where very little lifting effort is needed to bring the valve toward its back seat 16, and ultimately a point where retarding force is needed to prevent the fluid pressure from slamming the valve against its back seat 16.

The device operates in the following manner:

To open the valve and move the valve shaft head to regulating position, first cam 96 and second cam 98 rotate counterclockwise (Fig. 1) to move the valve shaft from the front seat toward the back seat. As first cam 96 rotates counterclockwise it engages roller 92 of first cam follower 86 to rotate first cam follower 86 about pivot 90. As first cam 96 continues to rotate counterclockwise it drives the trunnion carriers 73 which carry trunnions 44 of the first abutment member 36, to move the first abutment member relative to the second abutment and toward the first stop. As first abutment 36 moves to the left (see Fig. 5), spring 56, which is a small spring, is compressed between shoulders 48 and 52 of the first abutment and first stop, respectively. On further rotation of the first cam, first abutment shoulder 50 engages shoulder 54 of the first stop member to close gap X and provide a force on the first stop member to provide direct drive of the valve shaft to the left. Simultaneously with the movement of the first cam follower 86 counterclockwise, second cam 98 is designed so that it rides on a dwell until gap X is closed, and then it permits second cam follower 88 to also move counterclockwise so second abutment 37 will move at the same speed to the left as first abutment 36. The first cam and the second cam are angularly placed on the cam shaft so first cam follower 86 and second cam follower 88 move in parallel relation and maintain springs 56 and 72 under compression. Second cam follower 88, as it moves to the left, maintains gap Z between the second abutment member and third stop member. Spring 72, being compressed by the second cam follower, applies a force against second stop member 30 in a direction opposite to that applied by the first cam follower 86 on the first stop member. The application by the cam followers of one force in one direction against the first stop and a force in the opposite direction against the second stop is analogous, for example, to holding a rod between the hands, and while pulling the ends of the rod in opposite directions, moving both arms (cam followers) at the same speed in the same direction to translate the rod to a desired position. The force needed to translate the rod is only the amount of force necessary to move the arm, and would be in this case the force necessary to overcome the elastic fluid pressure. This force is independent of the size of the forces acting in opposition on the ends of the rod.

Accurate and positive regulation of the elastic fluid is provided by this arrangement. The first abutment engages the first stop and moves the valve shaft to the left against the elastic fluid pressure. However, when the valve is halfway open, the elastic fluid pressure now aids the movement of the valve shaft, and unless restrained will move the valve shaft and the first stop away from the first abutment and provide play between the drive and the valve shaft which would result in inaccurate regulation. The force in the opposite direction however, prevents the fluid pressure from moving the first stop away from the first abutment, and maintains the valve shaft under control of the cam followers regardless of which direction the valve shaft moves, since the first abutment engages the first stop and prevents valve shaft 3 moving toward the right relative to the second abutment, and the second abutment compresses spring 72 against the second stop to prevent valve shaft 3 moving toward the left relative to the first abutment.

To move the valve shaft from the regulating position to the back seat, the first and second cams rotate counterclockwise and move the valve shaft 3 to the left (as seen in Fig. 1). As valve shaft 3 is moved to the left, cam follower 86 will reach a dwell on first cam 96 and remain stationary. Second cam follower 88 will continue to move to the left, however, inasmuch as the second cam 98 has a low portion 110 (Fig. 6) which permits cam follower 88 to move in closer to shaft 94. When cam follower 86 reaches its dwell, second cam follower 88 will move relative to cam follower 86 which is stationary, and spring 72 will move second abutment member 37 relative to first abutment member 36. As the second abutment member continues to move to the left, shoulder 106 on second abutment member 37 engages shoulder 104 on the third stop member and will be prevented from moving any further to the left (Fig. 6). As the second cam 98 continues to rotate and fall away from the second cam follower, the force exerted by the compressed spring 72 in the opposite direction on the second stop is nullified by the equal and opposite force applied by spring 72 on the third stop member. As the force from spring 72 which is opposite to that applied against the first stop ceases, first spring 56 which has been held compressed by second spring 72 will expand and in concert with the elastic fluid pressure urge the valve shaft to its back seat 16.

In closing the valve, that is, moving back face 10 away from back seat 16 and front face 8 toward front seat 14, second cam 98 on rotation clockwise again contacts second cam follower 88 and moves the second abutment away from the third stop and against spring 72. Under ordinary circumstances the force necessary to move the valve shaft head away from back seat 16 and toward balance seat 14 is less than the force necessary to completely compress spring 72 and close gap Y. Therefore gap Y will remain between the second abutment and the second stop member. The purpose of gap Y is to permit the second abutment to move relative to the second stop member to compensate for the tolerances provided in the manufacture of the elements of the mechanism. Under unusual circumstances, for example, when back face 10 sticks to back seat 16, the pressure of the second abutment member on spring 72 will increase sufficiently so the second abutment member will move relative to the second stop member to compress spring 72 between them and move shoulder 66 of the second abutment member into direct contact with shoulder 70 of the second stop member to close gap Y. This provides a positive drive for moving valve shaft head 4 off of back seat 16. As the resistance to movement of valve shaft 3 is overcome, spring 72 will once again expand and move the second stop member away from the second abutment member to maintain gap Y between them once again. Simultaneously with the closing movement of second cam follower 88, first cam 96 permits first cam follower 86 to move inwardly toward the axis of cam shaft 94. Valve shaft 3, moved by second cam follower 88, causes first stop member 24 to compress spring 56 against first abutment member 36 and move shoulder 54 of first stop member 24 into engagement with shoulder 50 of first abutment member 36, to close gap X and urge first cam follower 86 to engage and follow first cam 96. The first and second cam followers then move in parallel relation and move the first and second abutment members at the same speed toward front seat 14 to cut off the supply of elastic fluid to the turbine. Valve shaft head 4 engages front seat 14 and is resiliently held against front seat 14 by spring 72. As second cam follower 88 reaches a dwell on second cam 98, first cam 96 has a low 97 closer to cam shaft 94, and first abutment 36 moves relative to the first stop to open gap X to provide room for thermal expansion of the parts.

The use of two relatively movable abutment members (36, 37) and the three stop members (24, 37 and 98) permits the cam followers to move the valve shaft in either direction while maintaining direct control at all times. The arrangement is such however, that when the valve shaft head is seated against the back seat or front seat, relative movement is permitted between the drive means and the valve shaft to permit expansion of the parts when heated. Further, when the valve shaft head 4 backseats, second cam follower 88 moves out of engagement with second cam 98 and only small spring 56 will urge first cam follower 86 against the cam. Small spring 56 merely keeps the first cam follower in engagement with the first cam and does not place a load on the cam shaft bearings 95 which support the cam shaft.

Further, the conventional type of valve normally has a huge spring that acts in opposition to the elastic fluid and this spring has to be big enough to hold the valve against the elastic fluid pressure. In the valve shown in the drawings, a huge spring is not needed. The second spring 72 and the first spring 56 expand and contract only the distance between the gaps X, Y and Z between the abutment members and the stop members. Further, the action of spring 72 is just the opposite of the springs normally employed, whereas usual practice is that you are increasing the load on the spring by compressing it as you open the valve, in this instance you are actually decreasing the load on the large spring 72 as you open the valve. This is because the second abutment and second stop member both move together with the valve shaft 3 to bodily translate spring 72 with the valve shaft, and do not increase the load on the spring. As a matter of fact, as opening progresses spring 72 is permitted to expand the length of gap Z which actually slightly decreases the load on the spring, and when the valve shaft head is finally backseated and the second abutment engages the third stop member, the spring is neutralized and applies no load.

Although a single embodiment of the invention has been illustrated and described, it will be apparent to one skilled in the art that various changes and modifications may be made therein without departing from the spirit of the invention or from the scope of the appended claims.

It is claimed and desired to secure by Letters Patent:

1. In a valve, a rectilinearly movable valve shaft carried in a valve housing, said valve shaft having a valve head for regulating the amount of elastic fluid being fed to a turbine wherein the elastic fluid pressure acts on the valve head and opposes and then aids movement of the valve shaft, first and second stop members affixed to said valve shaft, first and second abutment members movably carried by said valve shaft between said first and second stop members, first drive means carried by a support and interconnected with said first abutment for moving said first abutment against said first stop to apply a first force on said first stop member, second drive means carried by a support and interconnected with said second abutment for moving said second abutment against said second stop to simultaneously provide a force opposing said first force, control means cooperating with said first and second drive means to regulate the amount of force applied by said first and second drive means to move said valve shaft in a desired direction to regulate the elastic fluid, said opposing forces preventing the elastic fluid pressure from moving said valve shaft relative to said first and second abutments as said valve shaft moves from an area where the elastic fluid pressure opposes movement of said valve shaft to an area where the elastic fluid pressure aids movement of said valve shaft head.

2. A reciprocable shaft, a stop affixed to said shaft, a movable abutment carried by said shaft, first drive means carried by a support, said first drive means interconnected with said abutment to move said abutment into engagement with said stop to drive said shaft, second drive means carried by a support, said second drive means interconnected with said shaft to urge said shaft in an opposite direction to prevent outside force from moving said stop relative to said abutment, limit means cooperating with said second drive means to render said second drive means ineffective after said shaft has moved to a predetermined position, said outside force moving said shaft and said stop relative to said abutment when said limit means renders said second drive means ineffective, to provide a gap between said stop and said abutment so said shaft can elongate for thermal expansion.

3. In a valve having a valve shaft head for regulating the amount of elastic fluid to a turbine wherein the elastic fluid pressure opposes then aids seating said valve shaft head; a rectilinearly movable valve shaft carried in a valve housing, first and second stop members affixed to said valve shaft, first and second abutment members movably carried by said valve shaft between said first and second stop members, resilient means between said second stop member and said second abutment urging said second abutment away from said second stop member, a third stop member affixed to said valve shaft to limit the movement of said second abutment, first drive means carried by a support for moving said first abutment against said first stop to apply a force on said first stop member, second drive means carried by a support for simultaneously moving said second abutment against said resilient means to compress said resilient means and provide an opposing force on said second stop, control means cooperating with said first and second drive means to regulate the amount of force applied by said first and second drive means against said first and second abutment members to move said valve shaft in a desired direction, said opposing forces preventing the elastic fluid pressure from moving said valve shaft relative to said first or second abutment as said valve shaft moves from an area where the elastic fluid pressure opposes movement of said valve shaft to an area where the elastic fluid pressure aids the movement of said valve shaft, said control means when said valve shaft reaches said seating position permitting said resilient means to move said second abutment into engagement with said third stop to equalize the opposing force of said resilient means on said second stop, said elastic fluid pressure moving said valve shaft relative to said first abutment when said opposing force is equalized.

4. In a valve actuating mechanism for seating a valve; a reciprocable valve shaft carried in a valve housing, first and second spaced stop members affixed to said valve shaft, first and second abutment members movably carried between said first and second stop members by said valve shaft, first resilient means urging said first abutment away from said first stop member, second resilient means urging said second abutment away from said second stop member, a third stop member affixed to said valve shaft to limit the movement of said second abutment and take up the force of said second resilient means, a first cam follower pivotally supported by a support, means interconnecting said first cam follower and said first abutment means, a second cam follower pivotally supported by a support, means interconnecting said second cam follower and said second abutment, control means carried by a support, said control means moving said first and second cam followers in the same direction to move said first and second abutments at the same speed to move said valve shaft to a desired position while maintaining said first and second resilient means compressed against said first and second stop members respectively, said control means when said valve shaft reaches said desired position moving said second cam follower relative to said first cam follower to move said second abutment relative to said first abutment to move said second abutment into engagement with said third stop to equalize the force exerted by said compressed resilient means against said second stop, said first resilient means expanding to move said valve shaft relative to said first abutment to seat said valve when said second abutment engages said third stop.

5. A device as set forth in claim 4, wherein said first abutment and first stop are provided with complementary shoulders which contact for direct engagement when said first resilient means is compressed between said first stop member and said first abutment member to provide direct drive of said valve shaft.

6. A device as set forth in claim 4, wherein said second abutment member and said second stop member are provided with complementary shoulders maintained apart by said second resilient means, said control means moving said second abutment relative to said valve shaft to compress said second resilient means and move said complementary shoulders into engagement to provide direct drive of said valve shaft when said valve shaft encounters resistance to movement away from said desired position.

7. In a valve for regulating fluid flow to a turbine, actuating mechanism for backseating a valve shaft head, in which fluid pressure urges said valve shaft head toward its backseat; said valve shaft head connected to a reciprocable valve shaft, said reciprocable valve shaft carried in a valve housing, first and second stop members affixed to said valve shaft, first and second abutment members movably carried by said valve shaft between said first and second stop members, a first cam follower pivotally supported by a support, means pivotally interconnecting said first cam follower and said first abutment means, a second cam follower pivotally supported by a support, means pivotally interconnecting said second cam follower and said second abutment means, a first cam rotatably carried by a cam shaft for engaging said first cam follower, first resilient means between said first stop member and said first abutment member, said first resilient means urging said first abutment member away from said first stop member and in turn said first cam follower against said first cam, a second cam rotatably carried by said cam shaft for engaging said second cam follower, second resilient means between said second stop member and said second abutment member, said second resilient means urging said second abutment away from said second stop member and in turn said second cam follower against said second cam, a third stop member affixed to said valve shaft to limit the movement of said second abutment and in turn the movement of said second cam follower, said first cam moving said first cam follower and said first abutment to compress said first resilient means against said first stop to apply a first force on said valve shaft, said second cam simultaneously engaging said second cam follower to move said second abutment against said second resilient means to apply a second and opposite force on said valve shaft, said first abutment preventing said second resilient means from moving said second stop relative to said second abutment, said second abutment preventing said first resilient means from moving said first stop relative to said first abutment, said first and said second cams moving said first and second abutments simultaneously at the same speed in the same direction to reciprocate said valve shaft head to regulate the fluid flow to the turbine, said first and second cams initiating backseating said valve shaft head by moving said valve shaft head to a desired position, said second cam falling away from said second cam follower at said desired position, said second resilient means moving said second abutment into engagement with said third stop at said desired position to render said second cam follower incapable of following said second cam, said first resilient means and said fluid pressure moving said valve shaft relative to said first abutment to backseat said valve shaft head when said second abutment engages said third stop.

8. A device as set forth in claim 7 wherein said first and second abutment members are each made of relatively slidable parts, the part of the abutment member connected to the cam follower having a larger diameter than said valve shaft to permit said one part to slide perpendicular to said valve shaft to permit said valve shaft to be self-centering.

9. A device as set forth in claim 7, wherein said second abutment member and said second stop member are provided with complementary shoulders maintained apart by said second resilient means, said second abutment being moved by said second cam relative to said valve shaft to compress said second resilient means and move said complementary shoulders into engagement to provide direct drive of the valve shaft when said valve shaft head encounters resistance to movement away from said desired position.

10. A device as set forth in claim 9, wherein said first abutment and first stop are provided with complementary shoulders which contact for direct engagement when said first abutment member drives said valve shaft through said first stop member.

11. Valve shaft actuating mechanism for an elastic fluid valve, comprising: a rectilinearly movable valve shaft having a valve shaft head, said valve shaft carried in a valve housing, first and second fixed stop members carried by said valve shaft, a first movable abutment member and a second movable abutment member carried between said first and second fixed stops, a first spring carried between said first fixed stop and said first abutment member to urge said two members apart, a second spring carried between said second fixed stop and said second abutment member to urge said two members apart, said first abutment member having oppositely projecting trunnions, said second abutment member having oppositely projecting trunnions, a first pair of trunnion carriers for said first abutment's trunnions, a second pair of trunnion carriers for said second abutment's trunnions, said trunnion carriers supporting said trunnions for rectilinear movement, four links, the outer end of each of said trunnion carriers pivotally supported by one of said links, the other end of each of said links pivoted on one side of said valve shaft, the other end of said first pair of trunnion carriers which support said first abutment member pivotally supported by a first bifurcated cam follower, the other end of said second pair of trunnion carriers which support said second abutment member pivotally supported by a second bifurcated cam follower, said first and second bifurcated cam follower pivoted on the side of the valve shaft opposite the side said links are pivoted, a cam shaft rotatably carried by a support, a first cam rotatably carried by said cam shaft, said first cam moving said first cam follower and said first pair of trunnion carriers to move said valve shaft in a first direction to a predetermined position, a second cam rotatably carried by said cam shaft, said second cam moving said second cam follower and said second pair of trunnion carriers to move said valve shaft in a second direction opposite to said first direction, said two cams angularly located on said cam shaft so said first and second spring members are held in compressive engagement with said first and second abutment members respectively to provide opposite forces on said valve shaft, said cams cooperating to move said valve shaft head either in said first or second direction to control the amount of elastic fluid permitted through the valve, a third fixed stop carried by said valve shaft adjacent said second abutment member, said second cam, when said valve shaft reaches said predetermined position in said first direction, permitting said second spring to expand and move said second abutment member into engagement with said third fixed stop so said second cam can rotate out of engagement with said second cam follower, said first spring expanding to resiliently urge said valve shaft when said second abutment engages said third stop.

12. A device as set forth in claim 11 wherein said first and second abutment members are each made of two relatively slidable parts, the part of the abutment member connected to the cam follower having a larger diameter than said valve shaft to permit said one part to slide perpendicular to said valve shaft to permit said valve shaft to be self-centering.

13. A valve shaft actuating mechanism for a valve, said valve having a front seat and a back seat and containing a rectilinearly movable valve shaft having a head with a front face and a back face, said valve shaft head being movable from a position in which the front face of the valve shaft head abuts the front seat of the valve to close the valve to fluid, to a position in which the back face of the valve shaft head abuts the back seat of the valve to fully open the valve to fluid, said valve shaft actuating mechanism comprising: first and second stop members affixed to said valve shaft, a first abutment member and a second abutment member movably carried on said valve shaft between said first and second stop members, a first spring carried between said first stop member and said first abutment member, a second spring carried between said second stop member and said second abutment member, said first and second abutment members each having oppositely projecting trunnions, first, second, third and fourth trunnion carriers, a trunnion carrier for each of said trunnions, said first and second trunnion carriers supporting said oppositely projecting trunnions on said first abutment member, said third and fourth trunnion carriers supporting said oppositely projecting trunnions on said second abutment member, first and second cam followers pivotally mounted on one side of said valve shaft, said first cam follower pivotally connected to the ends of said first and second trunnion carriers which face said third and fourth trunnion carriers, said second cam follower pivotally connected to the ends of said third and fourth trunnion carriers which face said first and second trunnion carriers, a shaft supporting a first and second cam for rotation, said first cam cooperating with said first cam follower and said second cam cooperating with said second cam follower, first, second, third and fourth links pivotally supported on the side of the valve shaft opposite the side said cam followers are pivotally supported from, said first and second links pivoted to the other ends of said first and second trunnion carriers respectively to pivotally support said first and second trunnion carriers, said third and fourth links pivoted to the other ends of said third and fourth trunnion carriers respectively to pivotally support said third and fourth trunnion members, said first and second cams angularly located on said cam shaft to place said first and second spring members in compressive engagement with said first and second abutment members to provide opposite forces on said valve shaft, said cams cooperating to move said valve shaft head either toward the front face or back face to control the amount of fluid passing through the valve, a third fixed stop spaced from said second fixed stop member carried by said valve shaft, said second cam when said valve shaft head is moved to a position adjacent said back seat permitting said second spring to expand and move said second abutment member into engagement with said third fixed stop to take up the force of said second spring so said second cam can rotate out of engagement with said second cam follower to cease the opposite force on said valve shaft and permit said first spring to expand and move said valve shaft head's back face against the back seat, said second abutment member and said stop member provided with complementary shoulders, said second cam moving said second abutment relative to said second stop to compress said second spring and move said complementary shoulders into engagement with each other to provide direct drive of said valve shaft when said valve shaft head encounters resistance to movement away from said back seat.

References Cited in the file of this patent

UNITED STATES PATENTS

| | | |
|---|---|---|
| 1,889,909 | Upton | Dec. 6, 1932 |
| 2,543,649 | Wales et al. | Feb. 27, 1951 |
| 2,666,452 | Sheppard | Jan. 19, 1954 |